United States Patent [19]
Dziulko et al.

[11] Patent Number: 6,031,900
[45] Date of Patent: Feb. 29, 2000

[54] SELF-CONTAINED ELECTRONIC TELEPHONE RING RECORDER AND METHOD FOR ELIMINATING ERRORS

[76] Inventors: Adolphe Richard Dziulko, 62, avenue du Général de Gaulle, 94170 Le Perreux; André Dziulko, 84, rue de Charenton, 75012 Paris, both of France

[21] Appl. No.: 08/860,617
[22] PCT Filed: Dec. 11, 1995
[86] PCT No.: PCT/FR95/01639
   § 371 Date: Jun. 12, 1997
   § 102(e) Date: Jun. 12, 1997
[87] PCT Pub. No.: WO96/19067
   PCT Pub. Date: Jun. 20, 1996

[30] Foreign Application Priority Data

Dec. 13, 1994 [FR] France ................................. 94 14985

[51] Int. Cl.⁷ .......................... H04M 1/56; H04M 15/06
[52] U.S. Cl. ...................... 379/142; 379/396; 379/399
[58] Field of Search ........................ 379/142, 52, 102.02, 379/102.07, 354, 356, 93.03, 140, 141, 387, 396, 399

[56] References Cited

U.S. PATENT DOCUMENTS 5,583,921  12/1996  Hidaka ........................................ 379/93

FOREIGN PATENT DOCUMENTS

WO92/02097  2/1992  United Kingdom ............ H04M 1/57

*Primary Examiner*—Curtis A. Kuntz
*Assistant Examiner*—Binh K. Tieu
*Attorney, Agent, or Firm*—Horst M. Kasper

[57] ABSTRACT

A pocket calculator-sized, voice controlled, self-contained electronic telephone ring recorder contains a casing with a liquid crystal display, a voice control system, a decoder, and microprocessors. A number of rings transmitted to the telephone ring recorder is translated into digits shown on the liquid crystal display. The digits identify callers and reasons for calling. A linear digital watch attached to the casing allows to determine the time of a call.

15 Claims, 4 Drawing Sheets

SELF-CONTAINED ELECTRONIC TELEPHONE RING RECORDER AND METHOD FOR ELIMINATING ERRORS

BACKGROUND OF THE INVENTION

1. Field of the Invention

The invention relates to a telephone call recorder using the voice control technique and transforming successive sounds in digits displayed on a screen.

SUMMARY OF THE INVENTION

1. Purposes of the Invention

It is an object of the present invention to provide a telephone call recorder using the voice control technique and transforming successive sounds in digits displayed on a screen which can be grouped in order to read easily.

These and other objects and advantages of the present invention will become evident from the description.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

Figure 1:
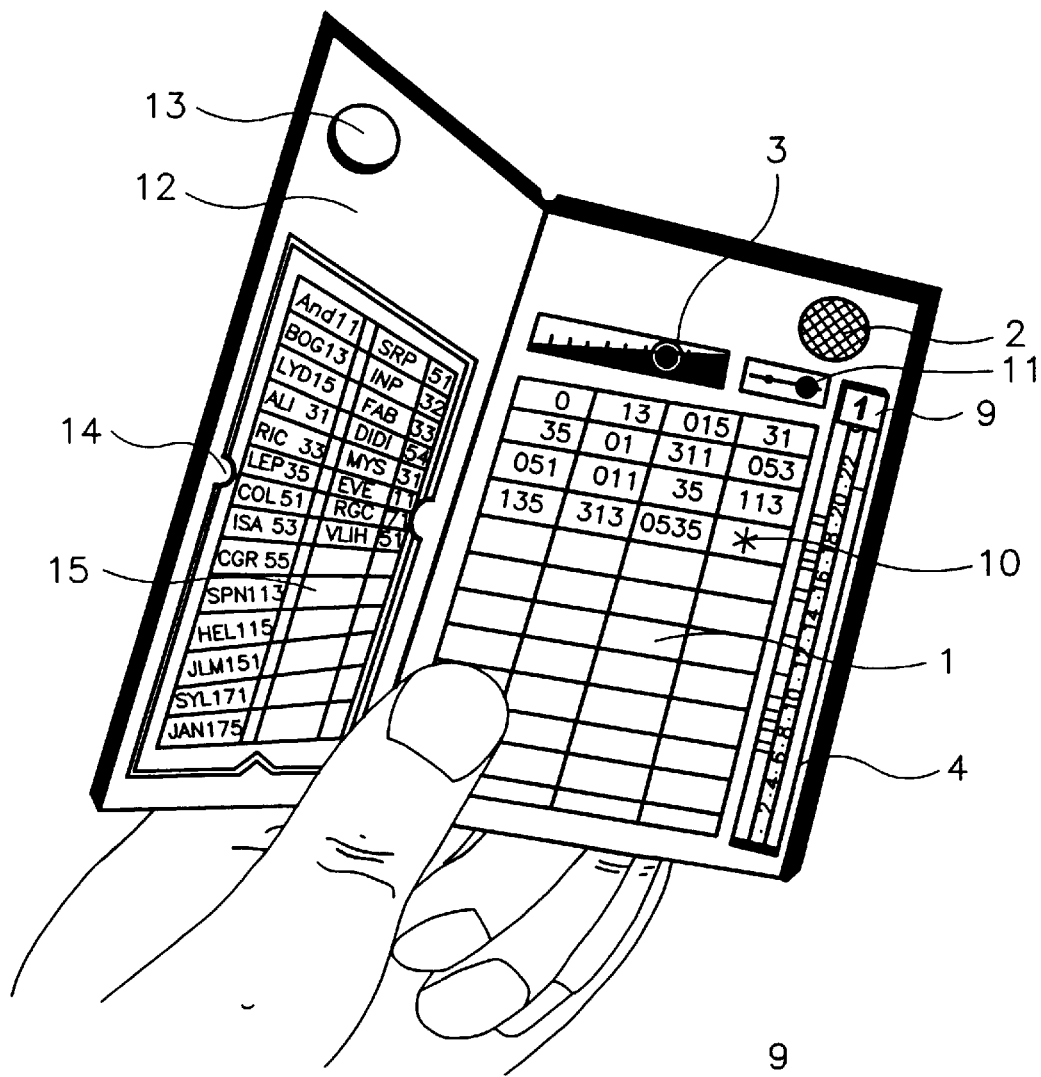
FIG. 1 is a perspective view of a telephone call recorder.
Figure 2:
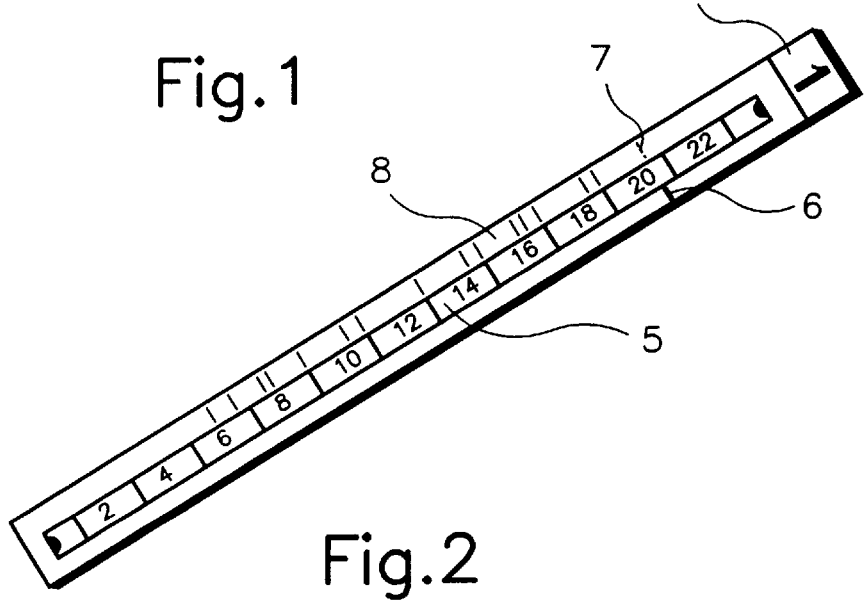
FIG. 2 is a schematic view of a watch.
Figure 3:
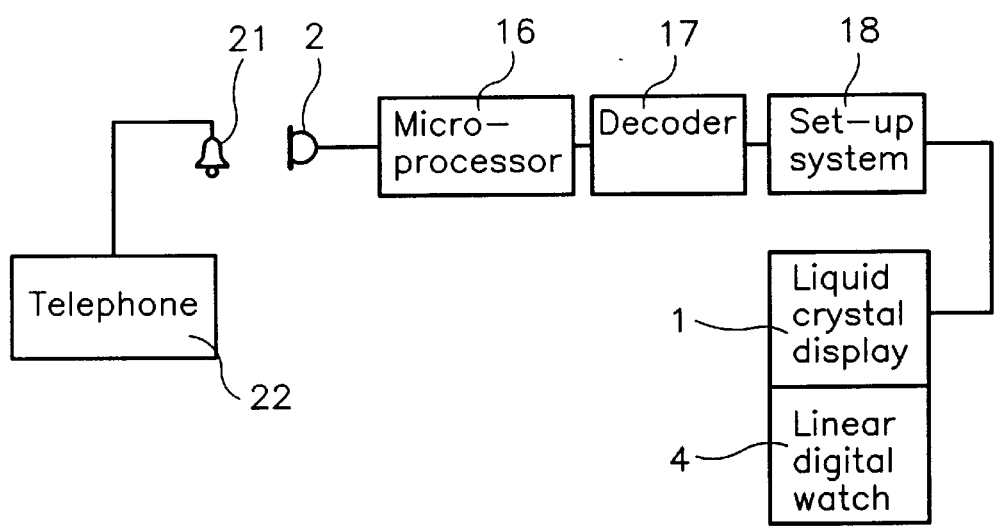
Figure 4A:
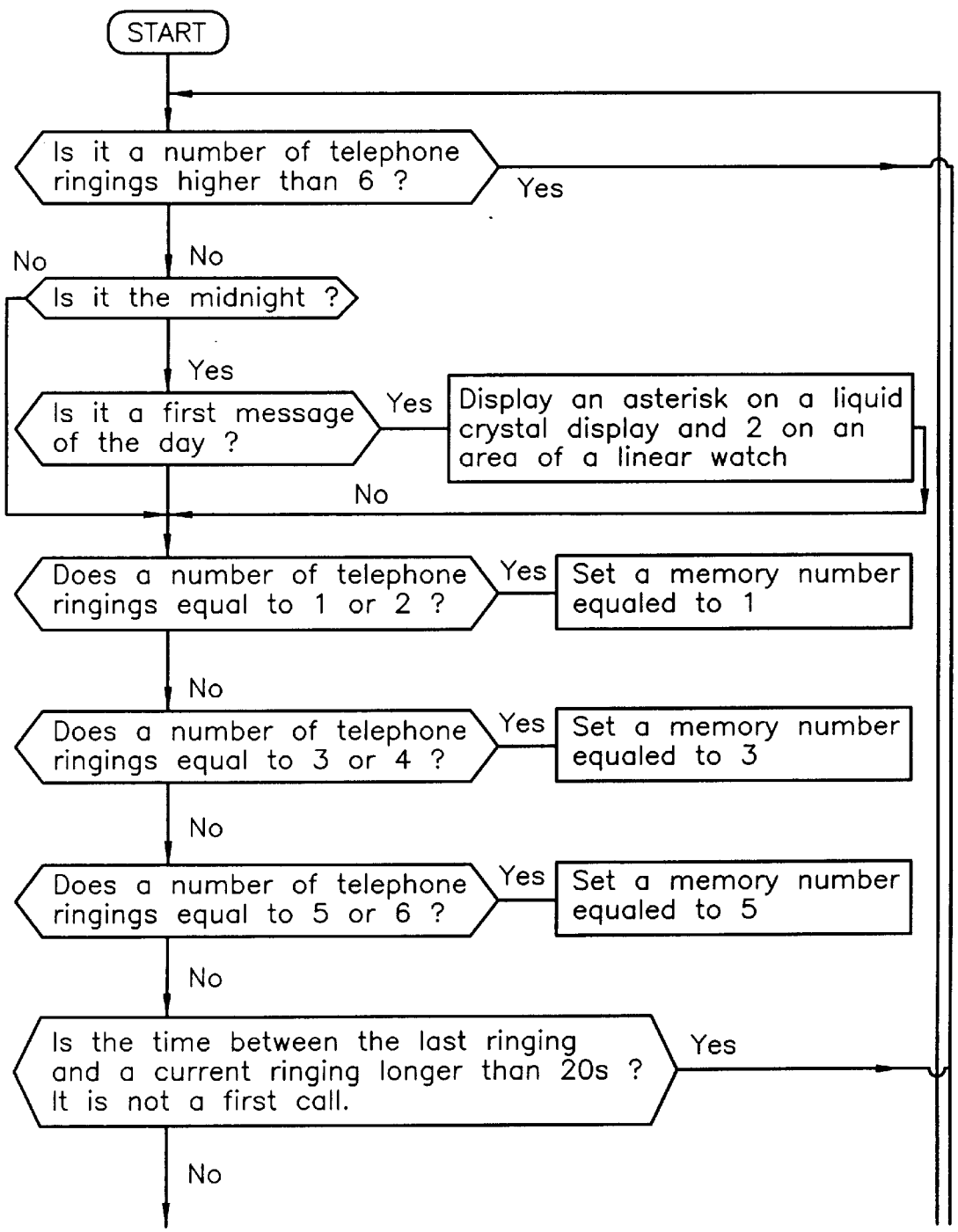
Figure 4B:
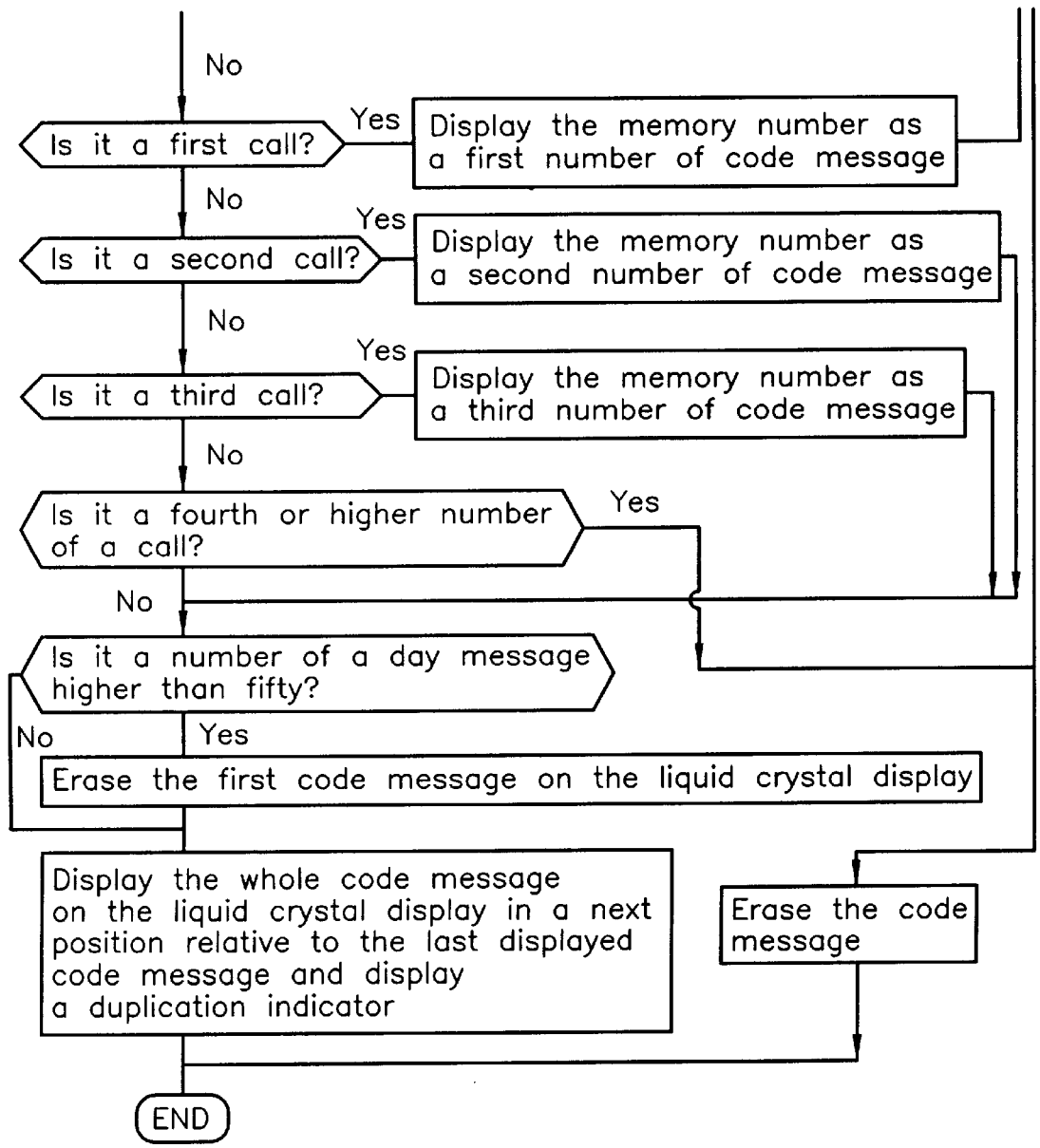

This recorder, the size of a pocket calculator, allows, starting from the telephone ringing, the registration on a liquid crystal display (1) of predetermined coded messages. The liquid crystal display is divided into segments. It is independent of any source and it is supplied by a battery which gives an autonomy of one year. A single glimpse on the display allows to understand all messages. It is completely visual which allows the utilization of the telephone by millions of deaf-mutes in the world. It includes a protection shutter (2) with an opening on the micro with vocal control (3). This shutter has a location in which one slides a cardboard sheet (5) with the names of all the members of the family group and friends as well as the code numbers attributed to each (6). Each ringing acts by the intermediate of the microphone (4) on the microprocessor, the decoder, the set-up system of the simple intervals between the units, the dozens and the hundreds and of change of state for the subsequent message. The sensibility of the micro is controlled by a potentiometer (7). In order to avoid the inherent errors of the systems in force in all the telecommunications of the world, not all the subsequent ringings are translated into corresponding digits but the ringing couples. One uses to form the code numbers the odd digits 1, 3 and 5. To transmit the signature 31 one does two calls, at the first one allows it to ring three times, at the second once. If on the other end of the wire the recorder has received four ringings and then two, it will record at least 31. The set-up of a simple interval is done after four seconds of silence, a time longer than silence between two successive ringings, a change of state occurs, after twenty seconds of silence. A number of ringings higher than six is translated by means of a zero.

In order to indicate the timetable of the calls of the last eighty-four hours a linear digital watch is connected to the electronic system. The time is indicated by a digital cursor which moves along the dial of eighty-four hours. This one allows a visible twenty hours track from the first ringing of a message (8). There are as many timetables as registered messages. The reading of the messages of the figure informs us that eleven calls have been received, the seventh the 311 registered at 10.30 comes from 31, Alice, who asks to be called back urgently. All double digits at the end of a message have this meaning. The dialling code 1, (10) first registration day, is replaced with 2 at midnight, and at the same time an asterisk appears * meaning the end of the messages of the day. At saturation of the display, the registered calls on the first line are erased, to leave place for the present ones and so on. This recorder is not in competition with existing and future recorders, it is near, it is furthermore a useful gadget.

With the help of its small size, its full autonomy, its great reliability and its aestheticism because it has two surfaces to show, it can become the inseparable companion of each telephone. Its relatively low purchase price, its free use favours its expansion to all the rich and poor countries.

The adding of a light synchronized with ringings to the telephone allows finally the deaf-mutes to utilizes the telephone.

It will be understood that each of the elements described above, or two or more together, may also find a useful application in other types of recorder differing from the types described above.

While the invention has been illustrated and described as embodied in the context of a telephone call recorder using the voice control technique, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An electronic device comprising
   a casing formed as a pocket calculator;
   a liquid crystal display divided into different display sections attached to the casing;
   a voice control system formed as a microphone and disposed in the casing;
   a decoder disposed in the casing;
   a microprocessor connected to the decoder wherein the microprocessor interprets an even number of telephone ringings as a number equal to an odd number reduced by one and an odd number of telephone ringings as equal to a number of telephone ringings for reducing an error risk; and
   a watch disposed in the casing, wherein coded messages in form of telephone ringings perceived by the microphone disconnect the voice control system and are displayed spatially and timely on the liquid crystal display as digits.

2. The electronic device according to claim 1, wherein a sensitivity of the microphone is regulated by a potentiometer.

3. The electronic device according to claim 1, wherein the microprocessor takes a number of telephone ringings higher than six as a zero and following telephone ringings have no further effect, and if no numbers follow the zero, this comes from an anonymous caller.

4. The electronic device according to claim 1, wherein all electric and electronic energies are supplied by a battery assuring an autonomy of one year.

5. The electronic device according to claim 1, wherein protection shutters form the casing, wherein one of the protection shutters is furnished with an opening to allow an access of sound to the microphone, with a location to maintain a bristol paper with a list of family members and friends and codes of family members and friends including only digits 1, 3 and 5 which allow identification of 24 corresponding codes, 11, 13, 15, 31, 33, 35, 51, 53, 55, 113, 115, 135, 151, 153, 313, 331, 335, 351, 353, 515, 535, 551.

6. The electronic device according to claim 1, wherein the watch is a digital and linear watch placed at an edge of the liquid crystal display, and wherein the watch is divided into three parts, in a middle—a graduate face from 0 to 24 hours, underneath the graduate face—a movable indicator which indicates the actual time, and above the graduate face —an indicator duplication which accompanies the movable indicator and materializes itself at a first telephone ringing of a new message.

7. The electronic device according to claim 1, wherein the display arrives at a saturation with fifty messages, whereupon a first message of a call is erased to allow free space for a message of a following call.

8. The electronic device according to claim 1, further comprising
a switch mounted to the casing for switching the liquid crystal display.

9. An electronic device comprising
a liquid crystal display permitting autonomous visualizing of predetermined coded messages associated with telephone ringings;
a microphone receiving a sound of the telephone ringings;
a microprocessor;
a decoder suitable for interpretation and translation into digits;
a linear digital watch placed on an edge of the liquid crystal display for indicating a time by displacing a digital cursor in a front face and for indicating a starting time of a message by a fixed trace left by a message when a first telephone ringing is detected.

10. The device according to claim 9, wherein the microprocessor processes couples of telephone ringings as decoding units for reducing error risks, wherein the microprocessor interprets more than six telephone ringings as a zero, wherein the microprocessor forms messages from the telephone ringings, wherein the microprocessor accounts for the digits 1, 3, 5 and zero, and wherein all double digits present at an end of a message mean "Call me urgently".

11. The device according to claim 9, further comprising
two foldable shutters forming a recorder, wherein one of the shutters has an opening allowing the access of sounds to the microphone furnishing a micro voice control;
a support implement attached to the liquid crystal display for allowing a cardboard sheet comprising a list of persons capable of emitting messages and capable of receiving messages together with code numbers of the persons on the list.

12. The device according to claim 9,
wherein the digital cursor circulates along a 24 hour face, wherein the digital cursor leaves a visible trace held for twenty-four hours, and wherein a number of traces is equal to a number of messages registered on a certain day.

13. The device according to claim 9, wherein a first line of messages of the liquid crystal display is erased in case of an overflow of messages, thereby leaving space for an additional message.

14. A method of processing telephone ringings comprising
receiving telephone ringings in a microphone;
decoding predetermined coded messages from the telephone ringings;
interpreting and translating the predetermined coded messages into digits in a decoder;
autonomously visualizing the predetermined coded messages from the telephone ringings on a liquid crystal display; displacing a cursor in a front face for indicating time; and
indicating a starting time of a message by a fixed trace left by the message when a first telephone ringing is detected.

15. The method of processing telephone ringings according to claim 14, further comprising
taking account of couples of telephone ringings as decoding units in a microprocessor;
reducing error risks by taking account of the couples of telephone ringings;
interpreting more than six telephone ringings as a digit zero;
assigning to all double digits the meaning "Call me urgently";
realizing a recorder by two foldable shutters;
allowing access of the sounds to the microphone forming a micro voice control through an opening in one of foldable shutters;
sliding a cardboard sheet comprising a list of persons capable of emitting and receiving messages and of their code numbers;
indicating an actual time with a digital watch by controlling a digital cursor circulating along a 24-hour face;
leaving a visible trace at the first telephone ringing for twenty-four hours; and
erasing the first line of messages when the liquid crystal display is overloaded and thereby leaving place for present messages.

* * * * *